United States Patent
Finkbeiner

(10) Patent No.: US 8,015,791 B2
(45) Date of Patent: Sep. 13, 2011

(54) FUEL CONTROL SYSTEM FOR GAS TURBINE AND FEED FORWARD CONTROL METHOD

(75) Inventor: Neil Robert Finkbeiner, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 471 days.

(21) Appl. No.: 12/272,874

(22) Filed: Nov. 18, 2008

(65) Prior Publication Data
US 2010/0122535 A1 May 20, 2010

(51) Int. Cl.
*F02C 9/00* (2006.01)
(52) U.S. Cl. ...................... 60/39.281; 60/772
(58) Field of Classification Search ............. 60/39.281, 60/772, 773, 776
See application file for complete search history.

(56) References Cited

U.S. PATENT DOCUMENTS

| | | | |
|---|---|---|---|
| 4,277,832 A | | 7/1981 | Wong |
| 5,279,107 A | * | 1/1994 | Meisner et al. ............ 60/773 |
| 6,527,862 B2 | | 3/2003 | McLoughlin et al. |
| 6,907,722 B2 | * | 6/2005 | Tanaka ................ 60/39.281 |
| 7,197,878 B2 | * | 4/2007 | Gainford .................. 60/773 |
| 7,266,427 B2 | | 9/2007 | Hansen et al. |
| 7,644,574 B2 | * | 1/2010 | Feiz .................... 60/39.281 |
| 7,685,802 B2 | * | 3/2010 | Feiz .................... 60/39.281 |
| 2003/0094000 A1 | * | 5/2003 | Zagranski et al. .......... 60/773 |
| 2007/0157619 A1 | | 7/2007 | Feiz |

* cited by examiner

*Primary Examiner* — Michael Cuff
*Assistant Examiner* — Phutthiwat Wongwian
(74) *Attorney, Agent, or Firm* — Nixon & Vanderhye P.C.

(57) ABSTRACT

A fuel controller for a combustion system in a gas turbine having a combustion system, a fuel supply, a pressure control valve proximate the combustion system and a first pressure sensor proximate the pressure control valve, the fuel controller including: a proportional-integrated (PI) logic unit generating a control command for the pressure control valve and receiving input signals representing a desired fuel pressure at the pressure control valve and an input signal from the first pressure sensor representing an actual fuel pressure at the pressure control valve, and a plurality of control gains stored in electronic memory of the controller, wherein each control gain is applicable to a predefined operating condition of the gas turbine, and wherein the controller determines which set of control gains is to be applied by the PI logic unit based on an actual operating condition of the gas turbine.

20 Claims, 4 Drawing Sheets

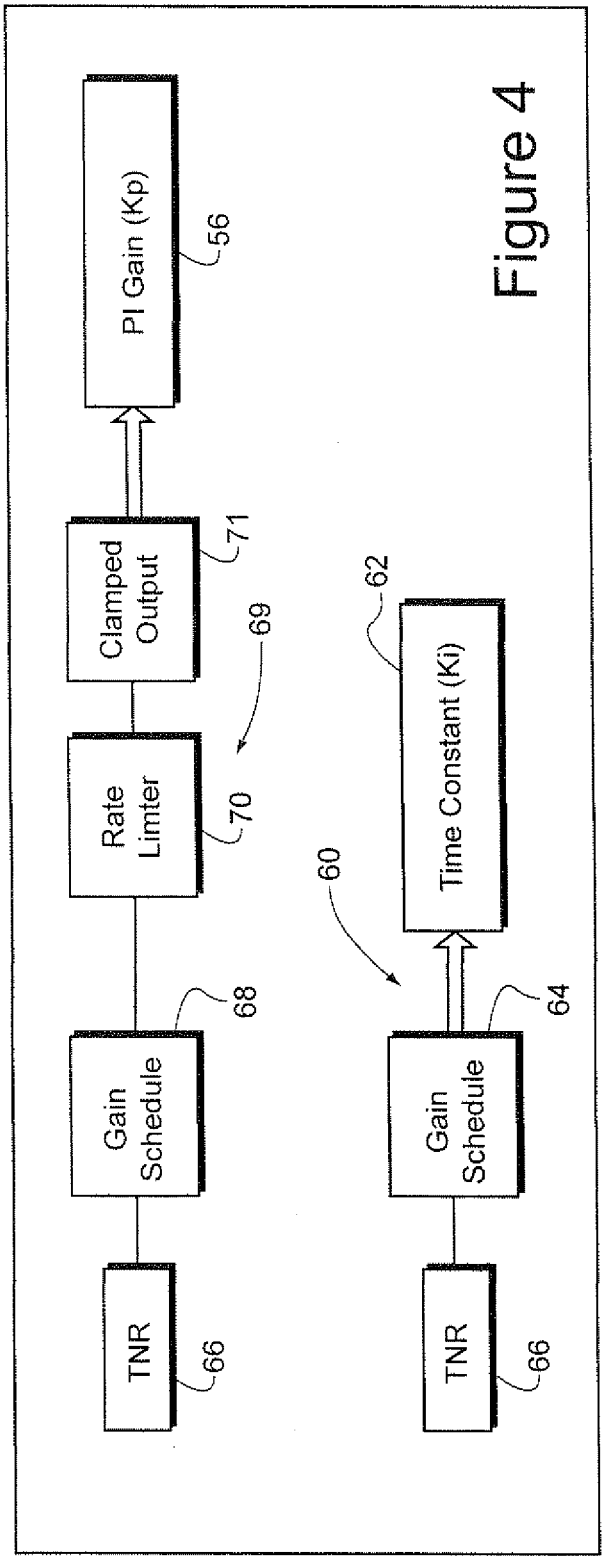
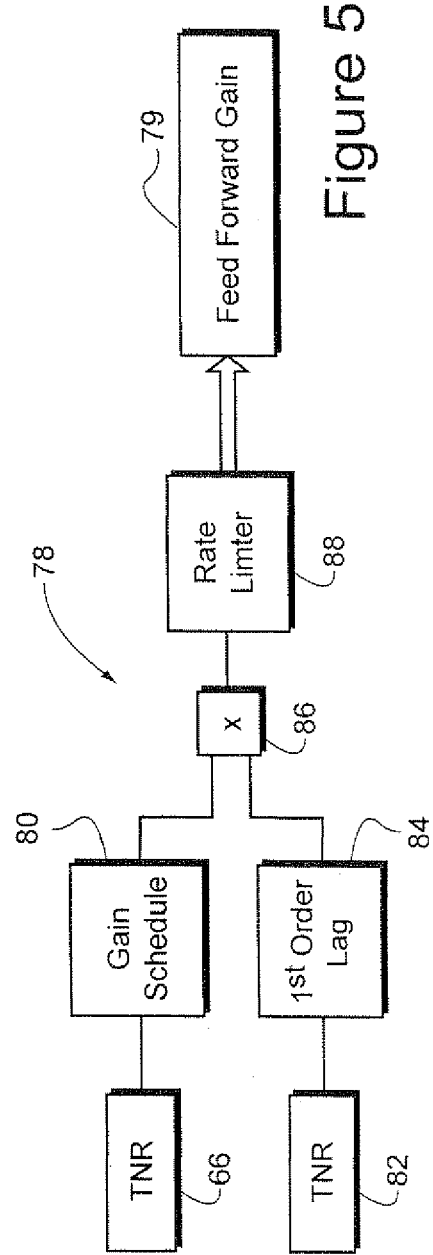

FUEL CONTROL SYSTEM FOR GAS TURBINE AND FEED FORWARD CONTROL METHOD

BACKGROUND OF THE INVENTION

The present invention relates to fuel control systems and, particularly, relates to fuel control systems for gas turbines.

Industrial and power generation gas turbines each include a combustion system that provides fuel, e.g., gas and or liquid fuel, to combustors. In a gas turbine, a fuel control system regulates the amount of fuel that is provided to fuel nozzles in the combustors. Fuel control systems typically include programmable logic circuits, such as computers or microcontrollers, that determine appropriate rate of fuel flow or pressures of the fuel flow to the fuel nozzles. These logic circuits may monitor the fuel flow rate and pressure, and other parameters of the combustion system in the gas turbine. These logic circuits dynamically adjust fuel control valves to maintain a desired fuel flow or pressure to the fuel nozzles.

Fuel control systems are intended to maintain a stable flow of fuel to the combustors over the entire operating range of the gas turbine. It is known to monitor the fuel pressure at the fuel nozzle and apply the fuel pressure as feedback to regulate the flow of fuel to a combustor. A conventional fuel controller, such as described in U.S. Patent Application Publication 2007/0157,619, has a proportional-integral (PI) control algorithm having a PI control gain applied to a fuel pressure feedback signal to maintain a constant fuel pressure to the fuel nozzles in a combustion system.

Undesired oscillation of fuel pressure and fuel flow and other undesired conditions of the fuel flow can result with conventional fuel controllers that include PI control algorithms. The oscillations in fuel pressure and flow may disrupt the operation of the combustion system. There is a long felt need to eliminate or at least reduce undesirable pressure oscillations in the fuel flow to the combustion system in an industrial gas turbine.

BRIEF DESCRIPTION OF THE INVENTION

A fuel controller has been invented for a combustion system in a gas turbine having a combustion system, a fuel supply, a pressure control valve proximate the combustion system and a first pressure sensor proximate the pressure control valve, one embodiment of the fuel controller includes: a proportional-integrated (PI) logic unit generating a control command for the pressure control valve and receiving input signals representing a desired fuel pressure at the pressure control valve and an input signal from the first pressure sensor representing an actual fuel pressure at the pressure control valve, and a plurality of control gains stored in electronic memory of the controller, wherein each control gain is applicable to a predefined operating condition of the gas turbine, and wherein the controller determines which set of control gains is to be applied by the PI logic unit based on an actual operating condition of the gas turbine.

A gas turbine has been invented which, in one embodiment, comprises: a compressor, turbine, combustion system and fuel supply; a fuel conduit extending from the fuel supply to the combustion system; a fuel supply pressure sensor proximate the fuel supply and sensing fuel pressure proximate to the fuel supply; a fuel pressure control valve regulating a fuel pressure in a downstream portion of the fuel conduit proximate to the combustion system; a combustion system fuel pressure sensor sensing fuel pressure in the downstream portion of the fuel conduit; a fuel controller including unit generating a control command for the pressure control valve and receiving input signals representing a desired fuel pressure at the pressure control valve and an input signal from the first pressure sensor representing an actual fuel pressure at the pressure control valve, and a plurality of control gains stored in electronic memory of the controller, wherein each of the control gain is applicable to a predefined operating condition of the gas turbine, and wherein the controller selects which control gain is to be applied by the PI logic unit based on an actual operating condition of the gas turbine.

A method has been invented to control a pressure of a gaseous fuel flowing from a fuel supply to a combustion system of a gas turbine, one embodiment of the method comprises: selecting a control gain from a plurality of control gains, wherein the selection is dependent on a current operating state of the gas turbine; sensing a pressure of the fuel flow proximate to the combustion system; determining a pressure difference between the sensed pressure and a desired fuel pressure; applying the selected control gain to the pressure difference to generate a correction, and applying the correction to adjust a pressure valve regulating the pressure of the gaseous fuel proximate to the combustion system.

The method may further include selecting another control gain from the plurality of control gains based on a changed gas turbine operating condition; applying the another selected control gain to the pressure difference to generate a correction, and applying the correction to adjust the valve. Further, the method may include applying the selected at least one control gain to the pressure difference to generate an proportional error data value which is proportional to the difference between the sensed pressure and the desired fuel pressure. In addition, the method may periodically determine the pressure difference and the proportional error data value; integrate the proportional error data value over time, and sum the result of the integration with a product of the proportional error data value and a time constant, wherein the time constant is selected from a plurality of time constants and the selected time constant is selected based on an operating condition of the gas turbine.

BRIEF DESCRIPTION OF THE DRAWINGS

FIG. 4 is a schematic diagram of a proportional-integral (PI) gain and time constant logic units included in the fuel control system.

FIG. 5 is a schematic diagram of a feed forward logic unit for the fuel control system.

DETAILED DESCRIPTION OF THE INVENTION

A fuel control system has been developed that uses a proportional-integral (PI) algorithm to regulate the fuel pressure in a gas turbine combustion system. The PI algorithm includes gain scheduling having different PI-gains for different gas turbine conditions and feed forward control based on pressure signals from a fuel supply upstream of the combustion system. The PI algorithm and feed forward control preferably maintain a constant pressure of the fuel flow at or near the fuel manifolds.

The fuel may be gas or liquid. The fuel control system disclosed herein is most applicable to gaseous fuel. If the gas turbine is adapted to run on gaseous and liquid fuel, the fuel control system disclosed herein may be applied to regulate the gaseous fuel and another fuel control system may be applied to regulate the liquid fuel.

Figure 1:
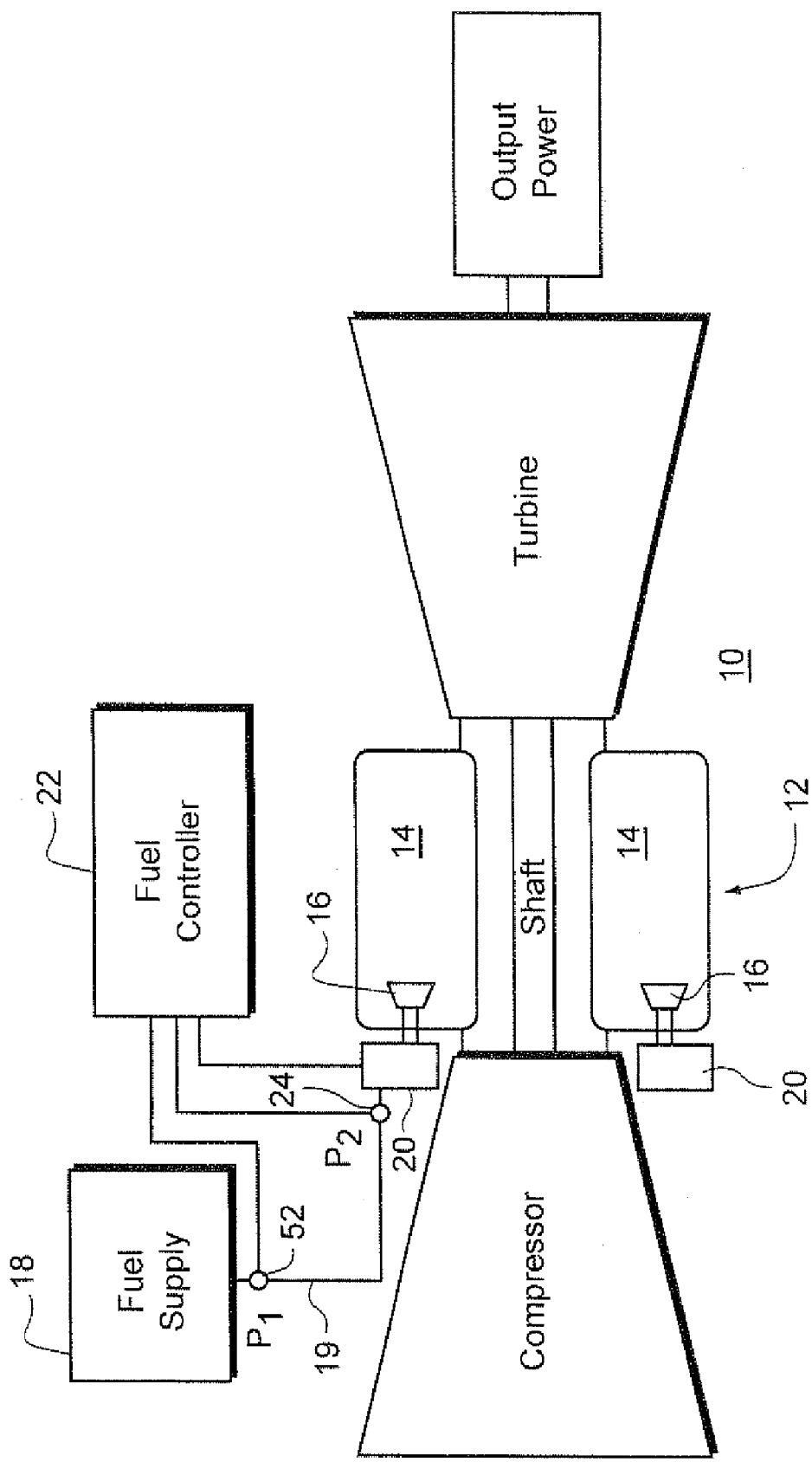
FIG. 1 is a schematic diagram of a gas turbine having a combustion system with multiple combustors, wherein each combustor includes a combustion chamber and fuel nozzles.
Figure 2:
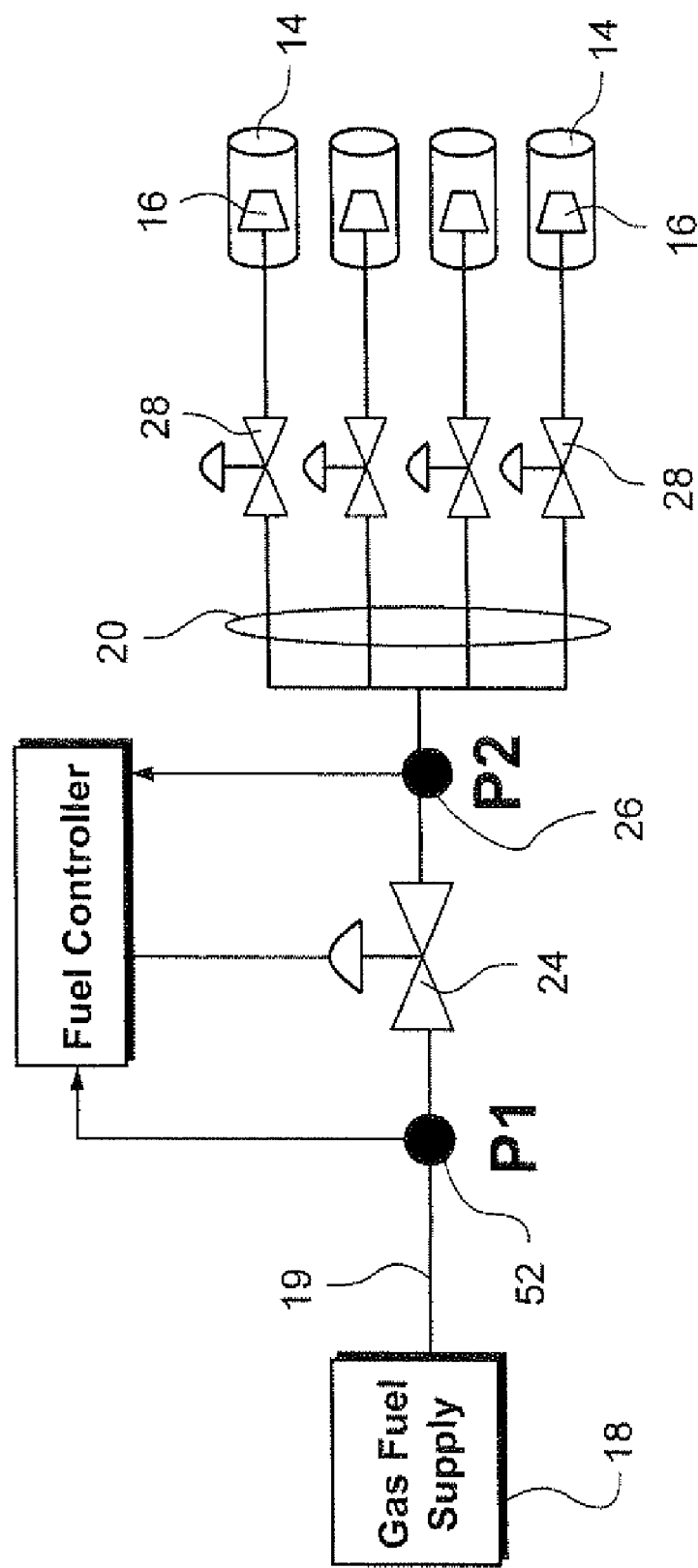
FIG. 2 is a schematic diagram of the fuel control valves for the combustion system shown in FIG. 1.

FIG. 1 is a schematic diagram of a gas turbine 10 having a combustion system 12 with multiple combustors 14, e.g., combustion cans, wherein each combustor includes a combustion chamber and one or more fuel nozzles 16. FIG. 2 is a schematic diagram of the fuel control valve system for the combustion system shown in FIG. 1.

A fuel supply 18 supplies a gaseous fuel via a conduit 19 to a fuel manifold 20 that is adjacent the combustors 14. The manifold distributes fuel from the fuel supply to the nozzles in each of the combustors. The fuel supply 18 may be 100 feet (33 meters) from the manifold. The distance from the manifold to the fuel nozzles may be much shorter, such as 10 feet (3 meters).

A fuel control system 22 regulates the pressure of the fuel flowing from the conduit 19 to the fuel manifold 20 by adjusting a fuel regulation valve 24 in the conduit 19 that is typically immediately upstream of the fuel manifold(s) 20. The pressure at the fuel regulation valve is typically referred to as the P2 pressure. The fuel regulation valve preferably maintains a constant pressure of fuel that is delivered to the manifold. The manifolds include gas control valves 28 for each nozzle 16. The gas control valves regulate the flow of gas to the nozzles. The control system 22 also provides control commands to set flow rate passing through the gas control valves. For the gas control valves 28 to provide accurate gas flow control, it is helpful that these 28 valves receive gas at a constant pressure and, specifically, that the P2 pressure be constant.

The P2 pressure is a good measure of the pressure of the fuel in the manifold 20 and at the nozzles 16. Maintaining a constant P2 pressure should provide a constant pressure of the fuel flowing to the combustors and their nozzles. The fuel regulation valve 24 preferably ensures that the P2 pressure remains constant.

A P2 pressure sensor 26 is preferably downstream but proximate to the fuel regulation valve 24 and upstream or in the manifold 20. The P2 pressure sensor may be an array of redundant pressure sensors, e.g., three pressure sensors, that monitor the P2 pressure just upstream of or in the manifold 20. The use of redundant sensors reduces the risk associated with a failing sensor, increases the reliability and accuracy of the P2 pressure data, and may allow the fuel control system to continue to receive P2 pressure data even if there is a failure in one of the redundant P2 pressure sensors. The P2 pressure sensor(s) 26 provide pressure data regarding the pressure (P2) of the fuel passing through the valve(s) 24 to the manifold and nozzles. Specifically, the pressure sensor(s) 26 monitors the gaseous fuel pressure (P2) proximate to the manifold(s) 20 and nozzles 16.

The P2 pressure is controlled by adjusting the pressure control valve(s) 24 that is proximate to the manifold. The pressure control valve(s) 24 receive the fuel at a higher pressure, e.g., at or near the P1 pressure level, than the desired P2 pressure. The pressure control valve(s) 24 reduces the fuel pressure to the P2 pressure level.

It is generally preferred that pressure control valve(s) 24 be controlled to maintain the P2 pressure as a steady, non-oscillating pressure and be maintained at the desired pressure specified by the pressure command 51 (FIG. 2). A technical effect of the fuel controller disclosed herein is to minimize or reduce the effects of oscillations and other undesired variations in gas fuel system supply pressure that is regulated by the pressure control valve 24.

The pressure control valve(s) 24 is adjusted to ensure that the P2 pressure remains at a desired P2 level and minimizes oscillations in the pressure of the fuel flowing through the manifold(s) and to the fuel nozzles. Adjustments are made to the pressure control valve(s) by the fuel control system 22.

The gas conduit 19 from the fuel supply 18 to the manifolds 20 and nozzles 16 may be long, such as over 100 feet (30 meters). A P1 pressure sensor 52 is proximate the fuel supply and monitors the fuel pressure (P1) in the upstream portion of the gas passage between the fuel supply and manifold. Pressure variances may arise in the long gas conduit 19. P1 pressure signals from the P1 pressure sensor 52 provide an early indication of pressure fluctuations that are propagating through the fuel conduit 19 and to pressure control valve 24. The fuel control system 22 includes a feed forward logic circuit that acts on the P1 pressure signal and adjusts the pressure control valve 24 in anticipation of the pressure fluctuations in the fuel supply or conduit 19.

Figure 3:
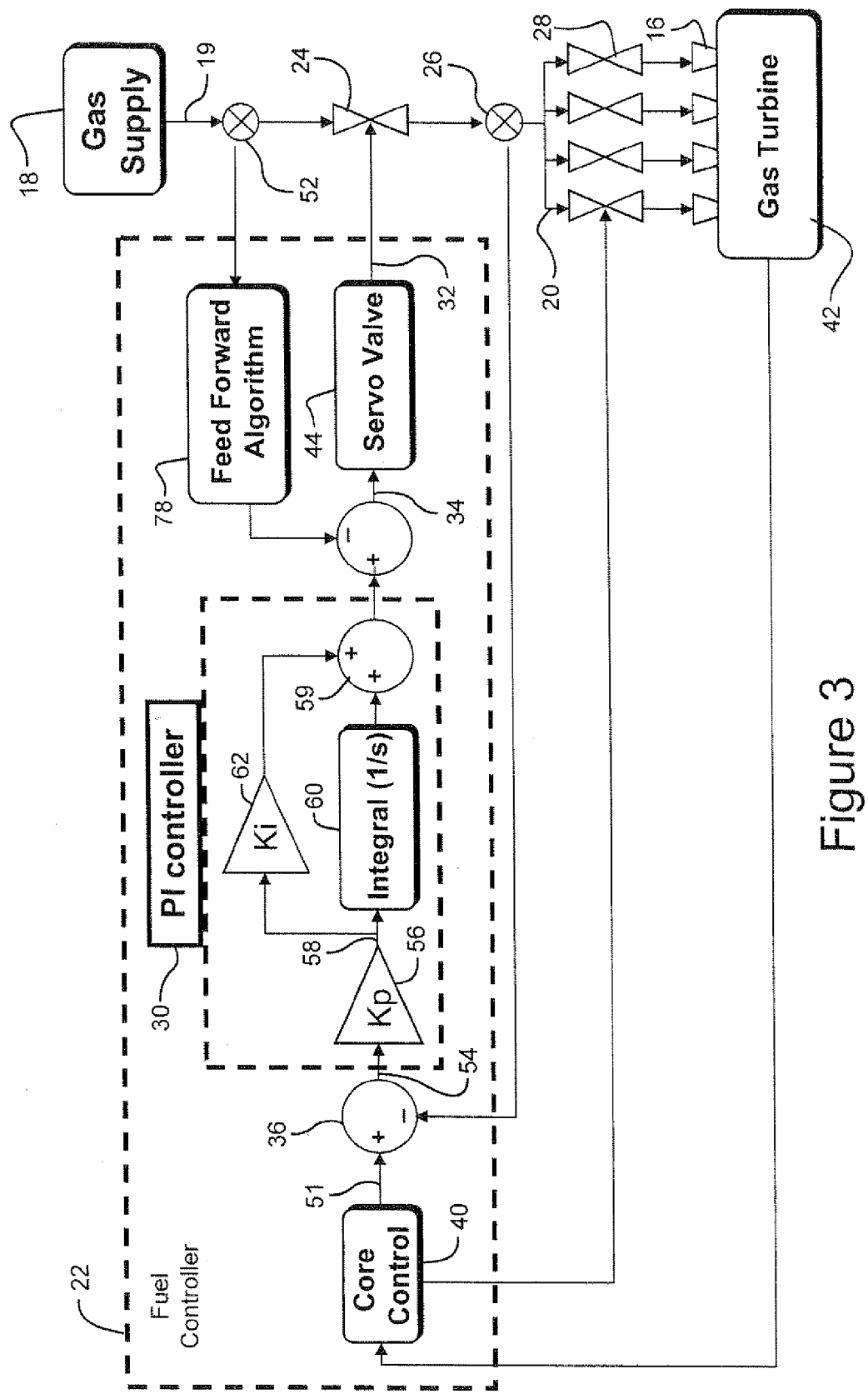
FIG. 3 is a schematic diagram of a fuel control system as applied to maintain a constant pressure in gaseous fuel flow to fuel nozzles.

FIG. 3 is a schematic diagram of showing a fuel controller 22 that includes a PI (proportional integral) fuel controller 30 to regulate the P2 pressure of the gaseous fuel flowing to the fuel manifold and nozzles. The PI controller 30 adjusts the pressure control valve 24 to stabilize the P2 pressure and maintain that pressure at a desired fuel pressure at the manifold 20 and nozzles 16. The correlations between the difference between the measured and desired P2 pressures and the adjustment to the valve(s) 24 are based on an algorithm with proportional (P) and integral (I) factors and the gains applied to each factor (collectively referred to as the PI controller 30).

The fuel controller 22 includes a conventional core fuel control system 40 that monitors the gas turbine 42 and provides a desired P2 fuel pressure command 51, e.g., a P2 pressure command, to the PI fuel controller 30. For example, the core fuel control system 40 may determine a desired P2 fuel pressure command as being proportional to turbine speed or the external load on the turbine. The desired fuel pressure command 51 indicates the desired P2 pressure of the fuel flowing through the manifold 20 and to the nozzles 16. The PI controller 30 receives the desired P2 pressure command 51 and determines the setting of the pressure control valve(s) 24 to achieve the desired fuel pressure. The PI controller 30 determines an appropriate valve position setting 32 for the pressure control valve(s) 24. Specifically, the PI controller 30 generates a valve servo command 34 for the servo valve 44 which in turns the valve to the desired valve position setting 32, which may be an open valve, a closed valve and in between valve positions, of the pressure control valve(s) 24. The P2 pressure sensor 26 measures the pressure immediately downstream of the pressure control valve(s) 24. The measured P2 pressure indicates whether the setting of the valve 24 provides the fuel pressure level prescribed by the PI controller 30.

The PI fuel controller 30 adjusts the pressure control valve (s) 24 to minimize pressure oscillations or other undesired disturbances in the P2 pressure, as reported by the P2 pressure sensor 26. Disturbances in the P2 fuel pressure may result from changes in the fuel supply and from pressure changes in the fuel manifold that propagates through the fuel regulation valves. To maintain a constant P2 fuel pressure, the PI fuel controller adjusts the fuel pressure regulation valve 24 by actuating the servo valve 44. For example, if the measured pressure rises from 100 pounds per square inch (psi) to 105 psi, the control system 22 may close the pressure control valve 24 by five percent (5%) to offset the undesired rise in P2 pressure.

The PI fuel controller 30 receives as an input pressure error data 54 indicating a pressure difference 36 between the desired P2 pressure command 51 and the P2 pressure data reported by the P2 pressure sensor 26. Preferably, the P2 pressure data is reported in real time and reflects the actual and current P2 pressure level. For example, the P2 pressure sensor may be sampled or generate a P2 pressure level signal at a rate of 25 Hertz (Hz). At this rate, the PI controller 30 calculates the error data 54 every $\frac{1}{25}$ of a second to the difference between the actual P2 pressure and the desired P2 pressure 51.

The PI fuel controller applies a proportional gain (Kp–56) to the error data 54 to generate a proportional error data 58. Each difference between the desired P2 pressure level and the measured P2 pressure are multiplied by the PI control gain (Ki). The PI control gain (Ki) is applied by the proportional gain logic unit 69 is based on multiple sets of gains stored in the control system 22. Each set is applied to a particular operating range of the gas turbine.

The PI fuel controller integrates a the error data over time to compensate for the rate of change of the error data in generating a command for the pressure control valve. The integration portion of the PI fuel controller sums 59 an integral 60 of the proportional error data 58 with the product 62 of a Ki constant (also referred to as a time constant) and the proportional error data 60. The sum 59 of the integration portion is outputted by the PI fuel controller. The sum 59 represents the adjustment to the error data 54 made by the PI controller to compensate for the rate of change in the error data and avoid inadvertently forming fuel pressure oscillations as the P2 pressure is corrected to the desired pressure level.

The integral unit 60 is preferably a logic function that generates a signal indicating a rate of change of the proportional error data 58. For example, the PI controller may receive real time P2 pressure data at a scan rate of 25 Hertz (Hz). The integral unit 60 may multiple the proportional error data 58 at the 25 Hz rate to generate a rate of change of the pressure data that is based on the scan rate of the P2 pressure sensor.

FIG. 4 is a schematic diagram of the logic for determining the proportional gain (Ki) and the time constant (Ki) used by the PI controller 30. The proportional gain and time constant logic may be stored in electronic memory of the fuel control system 22 and executed by a processor(s) in the fuel control system. The time constant (Ki) control logic 60 determines the time constant (Ki) 62 based on a time constant gain schedule 64 and a reference signal representing the turbine speed (TNR) 66. The time constant gain schedule 64 may be a listing correlating various time constants (Ki) to different turbine speeds (TNR) 66. The time constant (Ki) is applied to the proportional difference error data 58.

Varying the time constant (Ki) adjusts the quickness of the response of the PI control system to differences between the desired pressure 51 and the measured P2 pressure. At different gas turbine conditions, e.g., at different turbine speeds, it may be desirable for the PI control system to quickly minimize pressure differences and at other conditions (speeds) it may be preferred that the PI control system react more slowly to such differences. A variable time constant (Ki) allows the responsiveness of the PI controller to be adjusted for various gas turbine conditions.

The various sets of gains and individual gains may be listed in a schedule of PI gains correlated to different gas turbine operating conditions and, optionally, to different gas turbine speeds (TNR). Each set of gains may be stored in the controller as a look-up table in which various levels of gain are correlated with different gas turbine conditions, such as turbine speed or turbine load. To select an appropriate gain, the controller 22 may determine the appropriate gain schedule and thereafter look-up in the schedule a gain the most closely matches the current gas turbine speed or load. Further, the controller, may extrapolate between two gains in the look-up table if the current actual speed or load does not match the speed/load in the look-up table but is rather between two speeds/loads listed in the look-up table.

For example, a first set of gains may be applied during gas turbine start-up conditions from combustion light-off (which is when fuel is injected in the nozzles and the fuel is ignited) to when the gas turbine is coupled to when the circuit breakers are switched to coupled the gas turbine and generator to an electrical power load, such as a electrical power utility grid. This gain schedule for gas turbine startup may have a look-up table that correlates gains to turbine rotational speed. Another gain schedule may provide gains for use while the gas turbine is coupled to a load. This gain schedule may correlate gains to the load on the gas turbine. The controller 22 determines which gain schedule 68 to select depending on the gas turbine condition and within the selected schedule 68 look-ups a gain(s) based on the gas turbine speed/load 66.

The gain schedules 68 are generated to provide an appropriate PI gain to be applied by the fuel control system to determine the proper setting of the pressure control valve 24. The gain schedules 68 provides different PI gains that are suited to different gas turbine conditions. By accessing the gain schedule, an appropriate PI gain may be selected that is most appropriate for the current gas turbine condition and turbine speed.

The controller also includes a rate limiter 70 that ensures that the PI gain (Ki) does not change too rapidly. In addition, the controller includes a clamped output 71 logic unit that prevents the PI gain 56 from exceeding predetermined safety limits.

The gain logic unit may also include a sliding gain bias 76 that is applied, for example, while the power output of the gas turbine is transitioned to drive a generator, such as when breakers are engage to couple the power output of the gas turbine to the drive shaft of a generator. The schedule for the sliding gain 76 may extend from a startup power output to the base load (100 percent power) for a gas turbine. For example, the sliding gain bias may progressively and proportionally increase from one (1) to ten (10) as the gas turbine increases in power output from one (1) megawatt to one-hundred (100) Megawatts. The sliding schedule identifies the appropriate gain for the PI controller for several different load conditions on the gas turbine.

The PI gains may be generated by analyzing the frequency response of the P2 fuel pressure at various operating conditions and turbine speeds. In particular, a simulation of the frequency response of the P2 gas pressure may be used to determine the sets of the PI gains that minimize P2 pressure oscillations. The simulation allows the P2 frequency response to be analyzed at different operating conditions of and loads on the gas turbine.

The simulation of the P2 gaseous fuel flow and fuel control system may be run using various sets of PI gains and sliding gains. The frequency response of the P2 is analyzed for each set of PI gain and sliding gains. At each of several different load points, the frequency response of the gas turbine simulation is analyzed by applying iteratively different sets of gains. The iterative application of gains allows the fuel pressure response to be optimized at each load level for the gas turbine. The frequency response of the gas turbine simulation is used to determine which set of gain provide best combustor performance and maintains stable combustion.

The results of the simulation of P2 pressure, e.g., optimal gain schedules, may be further analyzed to confirm that the combustion process operates stably with the optimal gain schedules. For example, the stability analysis may determine margins for the gain, phase and bandwidth to confirm that the margins are sufficient for reliable combustor operation. Confirming that the requirements for gain and phase margins are satisfied indicates that the combustor will operate in stable mode. A bandwidth is the speed at which the control system 22 eliminates or mitigates P2 pressure errors. A wide bandwidth indicates that the controller responds fast and quickly mitigates P2 pressure errors. A balance is determined where the bandwidth provides a quick response but does not render the render the combustion system unstable. Gain margin is how much additional gain can be given. Phase margin is akin to the delay in the system.

In one example of a stability analysis, a short term sine wave is applied as a varying P2 pressure to the simulated control system. The ability to quickly dampen the oscillating P2 pressure indicates to stability of the PI gain. The magnitude drop in the sine wave is the gain and the delay in dampening is the phase shift.

The controller 22 also compensates for disturbances in the P2 pressure due to variations in the pressure (P1) of the fuel supply. The pressure sensor signal 52 of the fuel pressure (P1) of the gas supply and variances in this pressure signal indicate disturbances in the pressure of the fuel supply. Pressure disturbances in the fuel supply may propagate downstream and create disturbances in the P2 pressure at the fuel manifolds and nozzles. To adjust for the disturbances in the pressure from the gaseous fuel supply, the fuel controller 22 may include a feed forward disturbance gain 79 that applies a proportional feed forward gain to the P1 pressure signal from the second pressure sensor 52 to adjust the initial pressure command signal (P2).

The feed forward logic unit 78 applies corrective actions to P2 pressure regulation valve 24, as is shown in FIG. 3. The feed forward logic unit 78 looks to an upstream pressure sensor 52 that is proximate to the fuel supply. The upstream pressure sensor 52 may be distance, e.g., 100 feet (33 meters) from the fuel manifold 20. The feed forward logic unit 78 reacts to upstream pressure variances in the fuel supply. Because such variances do not normally occur, the feed forward logic unit 78 normally does not cause an adjustment in the servo command signal 34 applied to the servo valve 44 that adjusts the pressure control valve 24.

FIG. 5 shows schematically the logic for generating a feed forward gain 79 to be applied by the feed forward logic unit 78. The feed forward gain 79 is applied by the feed forward logic unit 78 to generate a proportional correction to the setting of the P2 regulation valve 24 based on the P1 pressure. The feed forward gain 79 is dependent on the speed or load 66 of the turbine which is proportionally adjusted based on a control gain, selected from a gain schedule(s) 80 and based on the operating condition of the gas turbine. In addition, the feed forward gain is also dependent on a preceding fuel gas pressure (FPG1) 82, which is temporarily stored in a first order lag logic unit 84. The proportionally adjusted rotational speed 66 and the preceding fuel gas pressure are multiplied 86 to generate a preliminary feed forward gain correction value 87. This feed forward gain value 87 is subjected to a rate limiter 88 that limits the rate of change of the gain value 87.

Thereafter, the gain value is outputs as the final feed forward gain, which is applied by the feed forward logic unit 78.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fuel controller for a gas turbine having a combustion system, a fuel supply, a pressure control valve proximate the combustion system and a first pressure sensor proximate the pressure control valve, the fuel controller comprises:
   a proportional-integrated (PI) logic unit generating a control command for the pressure control valve and receiving a desired fuel pressure input signal representing a desired fuel pressure from a core fuel control system and an actual fuel pressure input signal from the first pressure sensor representing an actual fuel pressure downstream of the pressure control valve, and
   a plurality of control gains stored in electronic memory of the controller, wherein each difference between the desired fuel pressure input signal and the actual fuel pressure input signal is multiplied by one of the plurality of control gains;
   wherein each control gain is applicable to a predefined operating condition of the gas turbine, and wherein the controller determines which of said plurality of control gains is to be applied by the PI logic unit based on an actual operating condition of the gas turbine.

2. The fuel controller of claim 1 wherein the fuel supply is a gaseous fuel supply, and the PI logic unit receives a second pressure signal indicative of a pressure of the gaseous fuel supply, and the PI logic unit includes a feed forward gain logic unit, wherein the feed forward gain logic unit determines a gain based on the second pressure signal.

3. The fuel controller of claim 1 wherein the PI logic unit includes an integration unit that integrates over time a proportional error data value indicative of a difference between the desired fuel pressure input signal and the actual fuel pressure input signal.

4. The fuel controller of claim 1 further comprising a plurality of time constants stored in the electronic memory, wherein a time constant is selected from the plurality of the time constants based on the an operating condition of the gas turbine, and wherein the selected time constant is applied by the an integration unit in the controller to calculate a product of the selected time constant and a proportional error data value indicative of a difference between the desired fuel pressure input signal and the actual fuel pressure input signal.

5. The fuel controller of claim 1 wherein the pressure control valve is proximate to a fuel manifold for the combustion system.

6. The fuel controller of claim 1 further comprising a feed forward logic unit in the PI logic unit, wherein the feed forward logic unit receives a fuel supply pressure signal from a second pressure sensor proximate to the fuel supply and generates an adjustment to the control command for the pressure control valve.

7. The fuel controller of claim 1 further comprising a plurality of schedules of proportional gain stored in the electronic memory, wherein the PI controller selects both one of the schedules of the proportional gain and a proportional gain valve using the selected schedule, and wherein the selected proportional gain is applied by the PI logic unit to generated the control command for the pressure control valve.

8. A gas turbine comprising:
a compressor, turbine, combustion system and fuel supply;
a fuel conduit extending from the fuel supply to the combustion system;
a fuel supply pressure sensor proximate the fuel supply and sensing fuel pressure proximate to the fuel supply;
a fuel pressure control valve regulating a fuel pressure in a downstream portion of the fuel conduit proximate to the combustion system;
a combustion system fuel pressure sensor sensing fuel pressure in the downstream portion of the fuel conduit;
a fuel controller including a proportional-integrated (PI) unit generating a control command for the pressure control valve and receiving a desired fuel pressure input signal representing a desired fuel pressure from a core fuel control system and an actual fuel pressure input signal from the first pressure sensor representing an actual fuel pressure downstream of the pressure control valve, and
a plurality of control gains stored in electronic memory of the fuel controller, wherein each of the control gains is applicable to a respective predefined operating condition of the gas turbine, and wherein the controller selects which control gain is to be applied by the PI logic unit based on an actual operating condition of the gas turbine, wherein each difference between the desired fuel pressure input signal and the actual fuel pressure input signal is multiplied by one of the plurality of control gains.

9. The gas turbine of claim 8 wherein the fuel supply is a gaseous fuel supply, and the PI logic unit receives a second pressure signal indicative of a pressure of indicative of the gaseous fuel supply and the PI logic unit includes a feed forward gain, wherein the feed forward gain determines a gain based on the second pressure signal.

10. The gas turbine of claim 8 wherein the PI logic unit includes an integration unit that integrates over time a proportional error data value indicative of a difference between the desired fuel pressure and the input signal from the first pressure sensor.

11. The gas turbine of claim 8 wherein the pressure control valve is proximate to a fuel manifold for the combustor.

12. The gas turbine of claim 8 further comprising a plurality of time constants stored in the electronic memory, wherein the time constants are selected based on the operating condition of the gas turbine, and wherein the selected time constant is applied by the integration unit to calculate a product of the selected time constant and a proportional error data value indicative of a difference between the desired fuel pressure and the input signal from the first pressure sensor.

13. The gas turbine of claim 8 further comprising a feed forward logic unit in the PI logic unit, wherein the feed forward logic unit receives a pressure signal from a second pressure sensor proximate to the fuel supply.

14. The gas turbine of claim 8 further comprising a feed forward logic unit in the PI logic unit, wherein the feed forward logic unit receives a pressure signal from a second pressure sensor proximate to the fuel supply and generates an adjustment to the control command for the pressure control valve.

15. A method to control a pressure of a gaseous fuel flowing from a fuel supply to a combustion system of a gas turbine, the method comprising:
selecting a control gain from a plurality of control gains, wherein each of the control gains is applicable to a predefined operating condition of the gas turbine engine and wherein the selection is dependent on a current operating state of the gas turbine;
sensing a pressure of the fuel flow upstream from the combustion system;
determining a pressure difference between the sensed pressure and a desired fuel pressure;
multiplying the selected control gain to the pressure difference to generate a correction, and
applying the correction to adjust a pressure valve regulating the pressure of the gaseous fuel proximate to the combustion system.

16. The method of claim 15 further including selecting another control gain from the plurality of control gains based on a changed gas turbine operating condition;
applying the another selected control gain to the pressure difference to generate a correction, and
applying the correction to adjust the valve.

17. The method of claim 15 wherein the fuel controller includes a proportional-integral (PI) logic unit that performs the step of applying the selected at least one control gain to the pressure difference to generate an proportional error data value which is proportional to the difference between the sensed pressure and the desired fuel pressure.

18. The method of claim 17 further comprising periodically determining the pressure difference and the proportional error data value; integrating the proportional error data value over time, and summing the result of the integration with a product of the proportional error data value and a time constant, wherein the time constant is selected from a plurality of time constants and the selected time constant is selected based on an operating condition of the gas turbine.

19. The method of claim 15 further comprising:
sensing a pressure level of the fuel proximate to the fuel supply;
applying a feed forward control gain to the sensed pressure level of the pressure fuel proximate to the fuel supply to generate a feed forward correction, and
adjusting the command using the feed forward correction.

20. The method of claim 15 further comprising applying a proportional gain to generated the correction, wherein the proportional gain is dependent on at least on of a rotational speed of the gas turbine or a load on the gas turbine.

* * * * *